Fig. 5.

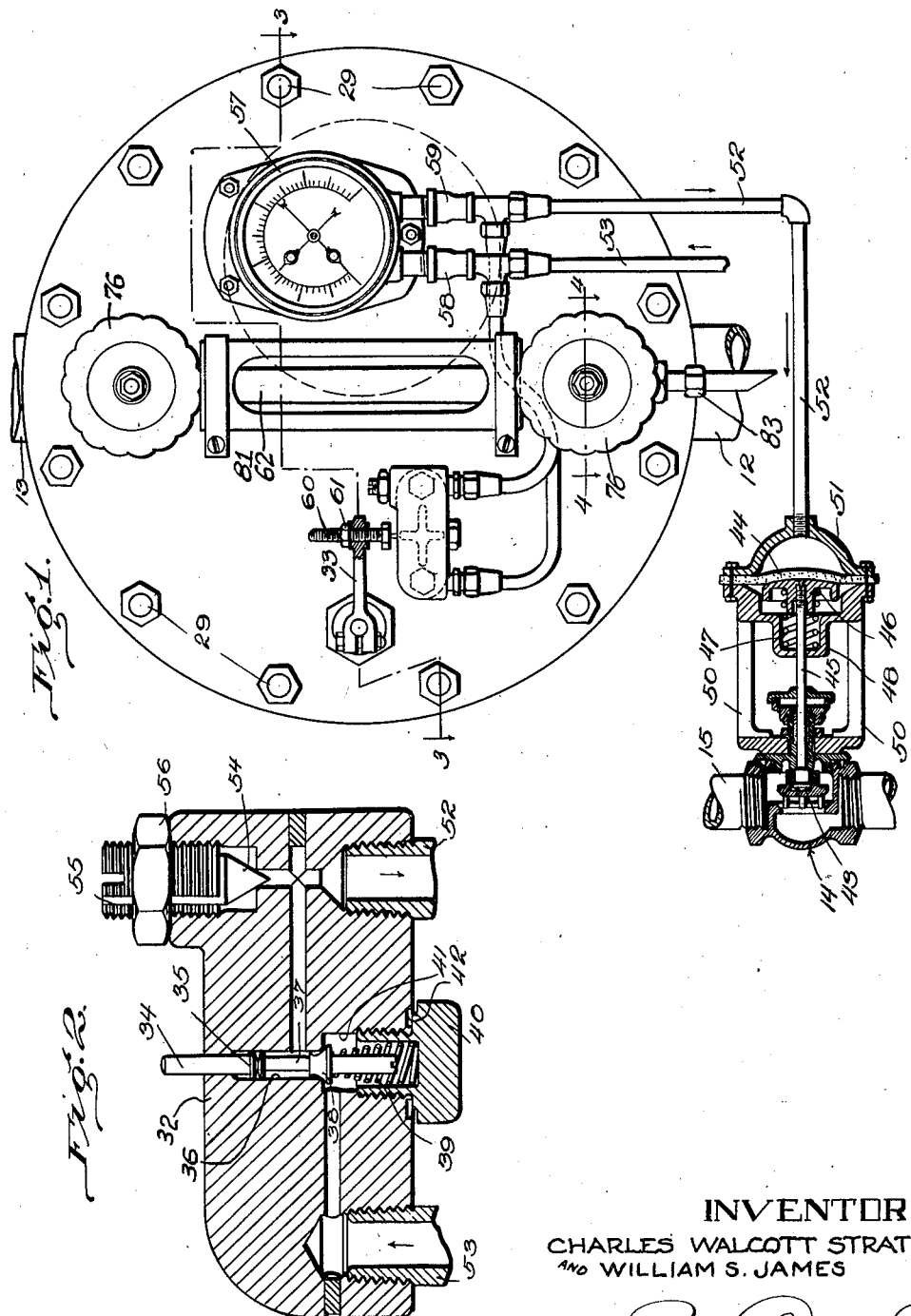

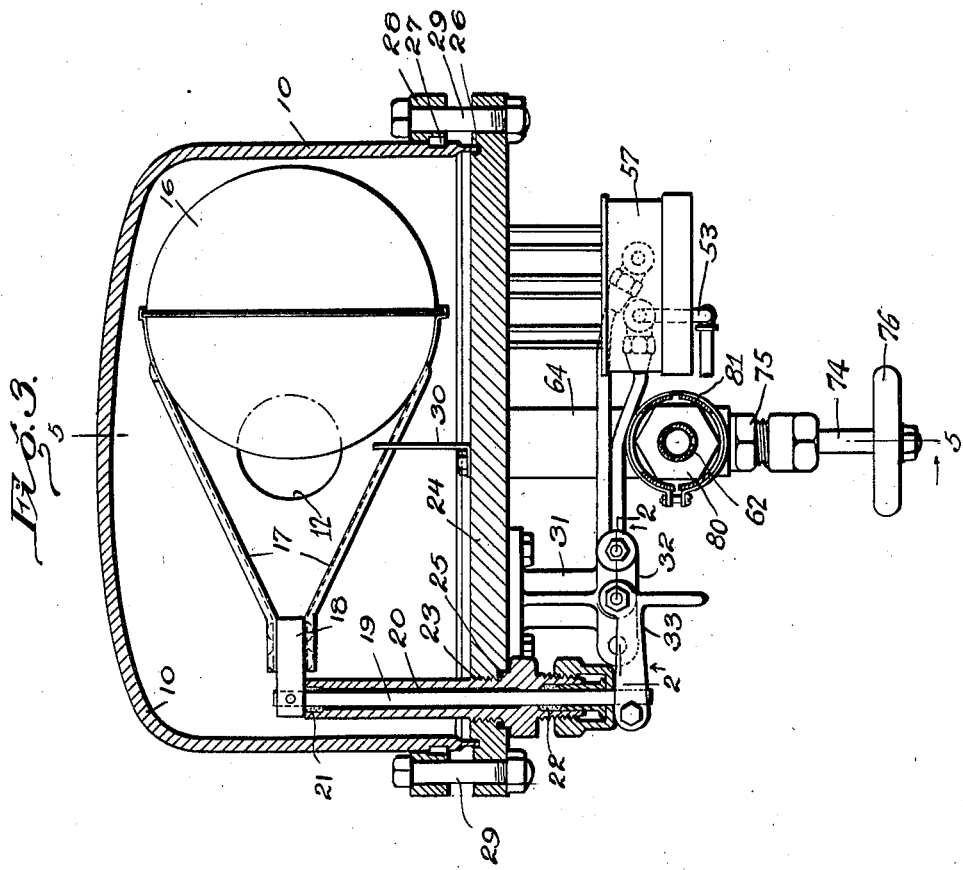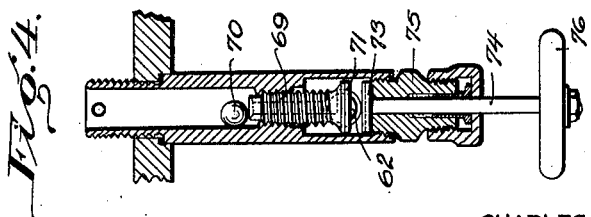

Patented Mar. 10, 1931

1,795,974

UNITED STATES PATENT OFFICE

CHARLES WALCOTT STRATFORD AND WILLIAM S. JAMES, OF SAN FRANCISCO, CALIFORNIA

LIQUID-LEVEL CONTROL

Application filed July 8, 1926. Serial No. 121,226.

The invention relates to liquid level control mechanisms and has as an object the provision of a mechanism of this nature having all of the active parts thereof carried by a head readily removable from the float chamber thereof.

A further object of the invention is the provision of a gauge glass for said mechanism having novel means for cutting the liquid off therefrom in the event of breakage of the glass and for replacing the glass.

A further object is the provision of a device of this character which will be particularly suitable for use in the refining of oil.

Further objects of the invention will appear from the following description when read in connection with the accompanying drawings, wherein:—

Figure 1 is a front elevation showing the diaphragm valve controlled by the device in section;

Figure 2 is a detail sectional view upon an enlarged scale on line 2—2 of Figure 3, wtih the float operated lever omitted;

Figure 3 is a horizontal section partly in elevation on line 3—3 of Figure 1;

Figure 4 is a detail sectional view on line 4—4 of Figure 1 upon an enlarged scale; and Figure 5 is a detail sectional view on line 5—5 of Figure 3 showing the gauge glass in section and other parts carried by the head omitted.

As shown the device comprises a float chamber 10 shown as cylindrical in section and provided with the dome shaped closure at one side integral with the cylindrical portion referred to. To connect the float chamber with a receptacle in which a liquid level is to be maintained there are shown conduits 11, 12, opening into the float chamber which may be connected with conduits into the container, not shown, as for instance by a form of union shown at 13. To control the level of the liquid in the container referred to a diaphragm control valve 14 is indicated in Figure 1 located in the conduit 15, which may be the same conduit as 12 communicating with the float chamber or which may be another conduit leading from the container. If the same conduit be used, the connection with the float chamber must be between the valve 14 and the container. As the level of the liquid in the container rises, the same level will be maintained in the float chamber 10, thereby causing a float 16 to rise. The float 16 is shown as connected by means of a yoke 17 with a stem 18 rigidly secured at right angles to a shaft 19 journalled in a sleeve 20. Stuffing glands 21 and 22 are provided to seal the shaft 19 where it projects from the sleeve 20. The sleeve 20 is shown as having screwthreaded engagement at 23 with an opening in a head 24, a gasket 25 being provided to seal the screwthreaded opening.

The head 24 is provided with a seat 26 coacting with the edges of the float chamber 10, which edges are preferably reduced in thickness to cause the pressure between the parts to be exercised upon a smaller area to assist in making the joint liquid-tight. As shown, a ring 27 is provided seated in a groove in the wall of chamber 10 coacting with a ring 28, which latter ring is clamped to the head by means of bolts 29. A stop member 30 is desirably provided to limit the upward movement of the float.

Mounted upon a pillar 31 is a valve housing 32 shown in section in Figure 2. The shaft 19 of the float is provided with a crank 33 which, when the float falls, is arranged to press inwardly upon a pin 34 carried in an opening in the valve housing 32 as shown particularly in Figure 2. The pin 34 is provided with a head 35 slidable in an enlarged bore 36 in the valve housing. When the float falls therefore the pin 34 places pressure upon a stem 37 of a substantially conical valve 38. To open the valve against the pressure of a spring 39 seating in a cavity in a plug 40, the plug 40 is shown as having screwthreaded engagement with the valve chamber 41 and a gasket 42 is preferably provided to insure a fluid tight engagement of the plug with the valve housing. By removal of the plug 40, the valve 38 and pin 34 may be freely removed from the housing.

To control the level of the liquid in the container, not shown, the valve 43 is provided adapted to be pressed to its seat by pressure placed upon a diaphragm 44 through the medium of a stem 45. A head 46 is shown upon the stem 45 to contact with the diaphragm 44. To press the valve to its open position, a spring 47 is shown seating in a cavity 48 in the diaphragm housing. The diaphragm may be clamped to the housing by means of bolts 49. The diaphragm housing is desirably supported from the housing of the valve 14 as by means of posts 50. To place pressure upon the diaphragm 44, a chamber 51 is shown having communication with a conduit 52 leading to the valve housing 32. The valve housing 32 is shown as provided with a second conduit 53 leading to a source of fluid, as air, under pressure.

To enable the pressure to escape from the conduit 52 when the valve 38 is closed, an adjustable bleed in the nature of a cone 54 is shown in Figure 2 and an escape is provided for the fluid to the atmosphere in the form of a channel 55. A lock nut 56 is provided upon the screwthreaded adjustment for the cone 54 to lock the same in adjusted position. With the device arranged as described, the float in its lowered position or in other words a low level of liquid in the container, not shown, will cause pressure upon pin 34 to open the valve 38 and allow fluid under pressure to flow from the source, not shown, through conduit 53 past the valve 38 through conduit 52 to the diaphragm chamber 51 thereby pressing the diaphragm 44 to close the valve 43. This will allow liquid to gather in the container, it being assumed that the device is to be used with a container into which liquid flows with greater or less rapidity and in which a liquid level is to be maintained. Closure of the valve 43 will allow liquid to gather in the container, not shown, until the level is sufficiently high to raise the float 16 when the valve 38 will close and the pressure within the diaphragm chamber 51 will bleed away past the cone 54. This will allow the spring 47 to open the diaphragm control valve and allow the escape of liquid from the container with a consequent lowering of the float.

A differential pressure gauge is shown at 57 having communication through conduits 58, 59, with conduits 52, 53, whereby to indicate the pressure in the respective conduits. The height of the liquid in the container may be adjusted within limits by the adjustment of the stem 60 upon the lever 33, a lock nut 61 being shown to set the adjustment desired.

To enable the liquid level in the float chamber 10 to be determined, a gauge glass 62 is shown mounted between connections 63, 64. These connections are shown as mounted in openings in head 24, nuts 65, 66, being shown upon their screwthreaded extremities.

Figure 5:
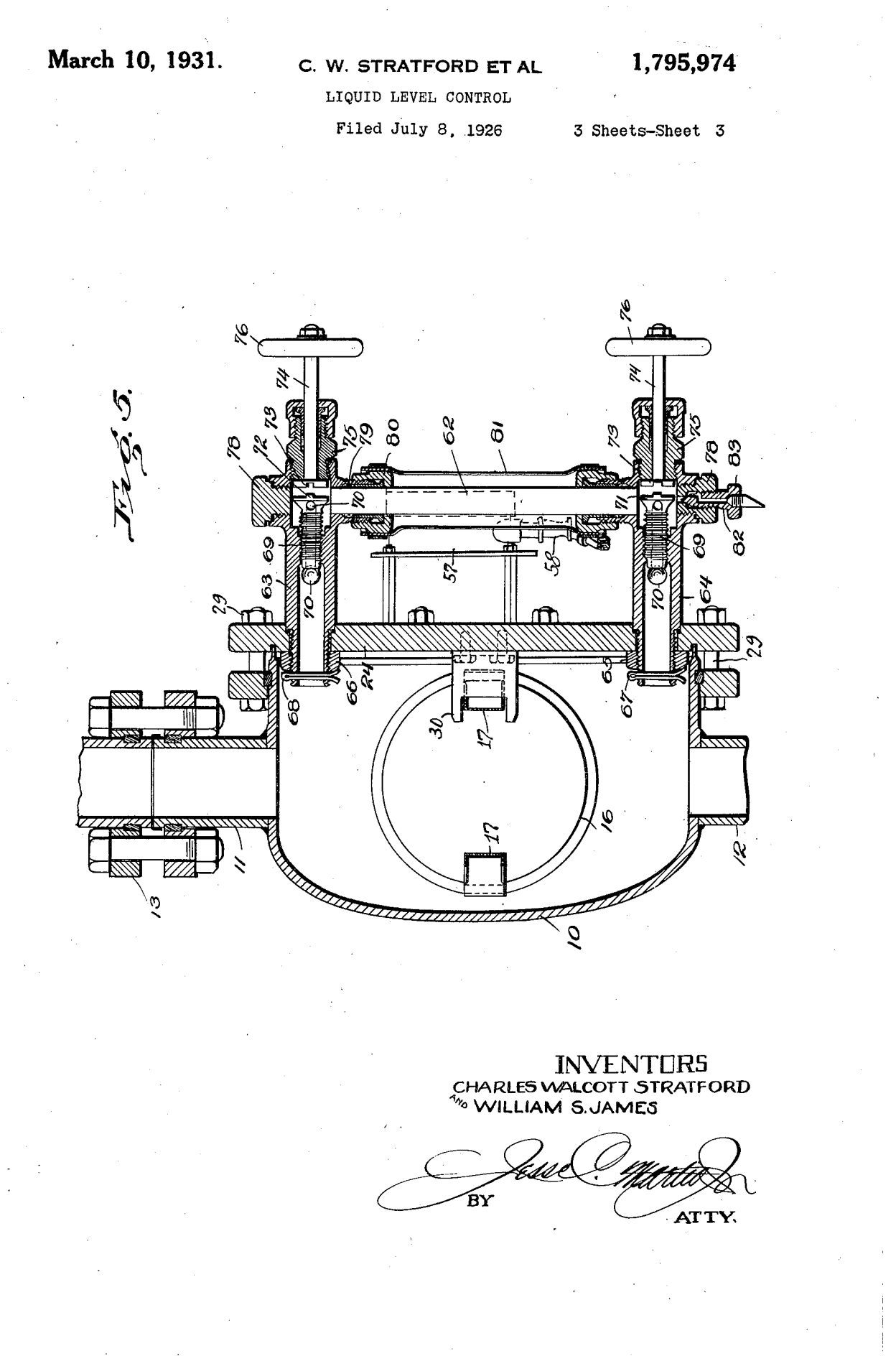

The communication of the gauge glass with the interior of the connections 63, 64, is shown as controlled by screwthreaded valve stems 69, the stems being longitudinally bored and provided with transverse channels 70 below the valve head 71, in each instance, whereby when the parts are in the position shown in Figure 5, there will be a free connection between the interior of the float chamber and the interior of the gauge glass 62. In the event of a sudden breakage of the gauge glass, the bores in the valve stems 69 may be closed in a well known manner by means of balls 70, cotter pins 67, 68, being provided through the ends of the connections 63, 64, to prevent escape of the balls from the chamber.

To provide for the screwing in of the valve stems 69 so as to cause the heads 71 to seat whereby to cut off the gauge glass, the heads 71 are shown as provided with a ridge 72 adapted to coact with a slot 73 in a head carried by stem 74 freely slidable in a plug 75 and adapted to be manipulated by handwheel 76.

To permit of a ready renewal or cleaning of the gauge glass 62, plugs 77, 78 are shown having screwthreaded engagement with the fittings 63, 64, the openings receiving the plugs being in alignment with the gauge glass and the inner diameter of the openings being in excess of the outer diameter of the gauge glass. By reason of the form of control of the valve 71 by means of stem 74 which may be pressed into engagement with the heads to screw the same home and then freely pulled therefrom into the position shown in Figure 5, the valves may be closed and the stem 74 removed from the path of removal of the gauge glass. The gauge glass is shown as clamped in the operative position by means of a stuffing gland 79 and a sleeve 80 at each end of the glass whereby the glass may be clamped in its operative position and sealed against the escape of liquid. A guard 81 is desirably provided about the gauge glass. To permit the draining of the glass 62 there is shown a plug 82 within the lower plug 78 controlled by a polygonal head 83. By screwing out this plug, liquid may be allowed to escape from glass 62 when desired.

In operation when the gauge glass 62 breaks under service conditions, the balls 70 immediately seat against the ends of the screw valves 69 shutting off the passage of liquid and vapor from the float chamber 10 with the exception of the leakage past the threads of the valves 69 in their threaded engagement in the connections 63 and 64. The slidable stems 74 are then engaged with the ends of the valves 69 through the slotted contact provided and upon rotating the stems 74 the valves 69 are screwed down tightly upon their seats shutting off all passage of liquid and vapor. The stems 74 are now slid away from engagement with the valves 69 in which position a complete clearance is provided for the removal of gauge glass 62 upon removal of the plugs 77 and 78. A new gauge glass is readily applied with safety after which the respective parts are assembled and the valves 69 opened for the passage of liquid from the float chamber 10.

By the structure provided by our invention, the float itself, the valve housing 32, and its connections, the pressure gauge 57, and the gauge glass structure are all mounted upon the head 24 which may be removed from the float chamber and as an entirety. Therefore it would be possible to have a duplicate head and mechanism to replace a defective mechanism and thereby the mechanism could be repaired without extended shutting down of operations to be carried on in the container, not shown, with which the mechanism may be utilized.

Minor changes may be made in the physical embodiment of the invention without departing from its spirit.

We claim:

1. A liquid level controlling mechanism comprising in combination, a float chamber having an opening, a head for closure of said opening, a float operable in said chamber, a stem upon which said float is mounted, said stem mounted in said head for oscillation, a valve housing carried by said head, a valve in said housing controlled by said stem, means attached to said housing chamber for connection with a source of fluid under pressure, means connected with said housing comprising a dual pressure gauge mounted upon said head to indicate the pressure in said connections respectively.

2. A liquid level controlling mechanism comprising, in combination, a float chamber having an opening, a head for closure of said opening, a float carried by said head, means mounted upon said head controlled by said float to control the level of liquid within the float chamber, a gauge glass with mountings on said head to indicate the liquid level within the float chamber, screw seating valves in the passages of the gauge glass mountings normally open for the communication of liquid from said float chamber to said gauge glass, valve seats for said valves providing a clearance for the removal of said gauge glass when said valves are seated, fluid actuated valves seating against the ends of said screw seating valves to close the passage of liquid therethrough, slidable and rotatable stems housed in said gauge glass mountings, means on the ends of said stems for engaging the ends of said screw valves whereby said valves are screwed on their seats, said stems being slidably disengageable from said valves when said valves are screwed upon their seats and providing a clearance for the removal of said gauge glass.

3. A liquid level controlling mechanism comprising, in combination, a float chamber having an opening, a head for closure of said opening, a float carried by said head, means mounted upon said head controlled by said float to control the level of liquid within the float chamber, a gauge glass with mountings on said head to indicate the liquid level within the float chamber, screw seating valves in the passages of the gauge glass mountings normally open for the communication of liquid from said float chamber to said gauge glass, valve seats for said valves providing a clearance for the removal of said gauge glass when said valves are seated, fluid actuated valves seating against the ends of said screw seating valves to close the passage of liquid therethrough, slidable and rotatable stems housed in said gauge glass mountings, means on the ends of said stems for engaging the ends of said screw valves whereby said valves are screwed on their seats, said stems being slidably disengagable from said valves when said valves are screwed upon their seats and providing a clearance for the removal of said gauge glass and permitting a free passage through said gauge glass from end to end thereof.

CHARLES WALCOTT STRATFORD.
WILLIAM S. JAMES.